(12) United States Patent
Chen et al.

(10) Patent No.: US 10,261,353 B2
(45) Date of Patent: Apr. 16, 2019

(54) DISPLAY DEVICE

(71) Applicant: InnoLux Corporation, Jhu-Nan, Miao-Li County (TW)

(72) Inventors: Yin-Lin Chen, Jhu-Nan (TW); Tsu-Chi Kuo, Jhu-Nan (TW); Yu-Kai Hsu, Jhu-Nan (TW); Jen-Hsiang Yen, Jhu-Nan (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 15/787,064

(22) Filed: Oct. 18, 2017

(65) Prior Publication Data

US 2018/0113353 A1  Apr. 26, 2018

(30) Foreign Application Priority Data

Oct. 20, 2016 (CN) .......................... 2016 1 0912775

(51) Int. Cl.
*G02F 1/1333* (2006.01)
*G02F 1/1335* (2006.01)

(52) U.S. Cl.
CPC .. *G02F 1/133308* (2013.01); *G02F 1/133528* (2013.01); *G02F 1/133553* (2013.01); *G02F 1/133606* (2013.01); *G02F 2001/133317* (2013.01); *G02F 2202/28* (2013.01)

(58) Field of Classification Search
CPC ......... G02F 1/133308; G02F 1/133553; G02F 1/133528; G02F 2001/133317
See application file for complete search history.

(56) References Cited

U.S. PATENT DOCUMENTS

| 8,864,358 | B2* | 10/2014 | Nambu | G02B 6/0031 |
|---|---|---|---|---|
| | | | | 362/511 |
| 8,870,438 | B2* | 10/2014 | Ozawa | G02B 6/0031 |
| | | | | 349/58 |
| 9,612,466 | B2* | 4/2017 | Arita | G02F 1/133308 |
| 2008/0106675 | A1* | 5/2008 | Uesaka | G02B 5/3016 |
| | | | | 349/98 |
| 2014/0204281 | A1* | 7/2014 | Maeda | G02F 1/133611 |
| | | | | 348/794 |
| 2015/0198756 | A1* | 7/2015 | Song | G02B 6/0025 |
| | | | | 349/65 |

* cited by examiner

*Primary Examiner* — Hoan C Nguyen
(74) *Attorney, Agent, or Firm* — Muncy, Geissler, Olds & Lowe, P.C.

(57) ABSTRACT

A display device includes a supporting frame, a display panel, an optical film assembly, and a light-penetrated adhesive member. The supporting frame includes a first supporting portion, and the display panel is disposed on the supporting frame. The display panel includes a pixel region and a non-pixel region, and the non-pixel region is disposed outside of the pixel region. The optical film assembly is partially disposed between the first supporting portion and the display panel. The light-penetrated adhesive member is disposed between the first supporting portion of the supporting frame and the optical film assembly. The light-penetrated adhesive member includes a first portion disposed corresponding to the non-pixel region and a second portion disposed corresponding to the pixel region. The configuration can achieve the narrow border design, provide a sufficient structural strength, or improve the light leakage or shadow issue at the edge of the active area.

18 Claims, 5 Drawing Sheets

DISPLAY DEVICE

CROSS REFERENCE TO RELATED APPLICATIONS

This Non-provisional application claims priority under 35 U.S.C. § 119(a) on Patent Application No(s). 201610912775.5 filed in People's Republic of China on Oct. 20, 2016, the entire contents of which are hereby incorporated by reference.

BACKGROUND

Technical Field

The present disclosure relates to a display device and, in particular, to a display device with a narrow border design.

Related Art

With the development of technologies, flat display devices have been widely applied to various fields. Due to the advantages such as low power consumption, less weight, compact size and less radiation, the liquid crystal display (LCD) devices have gradually replaced the traditional cathode ray tube (CRT) display devices and been applied to various electronic products, such as mobile phones, portable multimedia devices, notebook computers, liquid crystal TVs and liquid crystal screens.

Regarding the structure of the conventional LCD module (including the display panel and the backlight module), the border region of the display panel, which is other than the pixel region, is supported by a plastic member (e.g. a frame). In other words, the plastic member supports the inactive area of the display panel for providing a sufficient fixing strength. However, the above design is not suitable for the narrow border design (e.g. the border is equal to or less than 1 mm). In more details, since the width of the border is not large enough, the frame (the plastic member) and the rubber, which is disposed between the frame and the display panel for connecting the frame and the display panel, are extended to the pixel region (active area). Because the rubber is made of opaque materials, this configuration will minimize the area of the active area or cause the light leakage or shadow issue at the edge of the active area, which can affect the displayed images.

SUMMARY

An objective of the present disclosure is to provide a display device that can achieve the narrow border design, provide a sufficient structural strength, or improve the light leakage or shadow issue at the edge of the active area.

The present disclosure discloses a display device including a supporting frame, a display panel, an optical film assembly, and a light-penetrated adhesive member. The supporting frame includes a first supporting portion, and the display panel is disposed on the supporting frame. The display panel includes a pixel region and a non-pixel region, and the non-pixel region is outside of the pixel region. The optical film assembly is partially disposed between the first supporting portion and the display panel. The light-penetrated adhesive member is disposed between the first supporting portion of the supporting frame and the optical film assembly. The light-penetrated adhesive member includes a first portion disposed corresponding to the non-pixel region and a second portion disposed corresponding to the pixel region.

The present disclosure also discloses a display device including a supporting frame, a display panel, an optical film assembly, a light-penetrated adhesive member, and a connecting circuit board. The supporting frame includes a first supporting portion, and the supporting frame is light penetrated. The display panel is disposed on the first supporting portion of the supporting frame. The optical film assembly is partially disposed between the first supporting portion of the supporting frame and the display panel. The light-penetrated adhesive member is disposed between the first supporting portion of the supporting frame and the optical film assembly. The connecting circuit board includes a reflective surface disposed corresponding to a side surface of the supporting frame. The side surface of the supporting frame is substantially parallel to a normal direction of the display panel.

As mentioned above, in the display device of this disclosure, the supporting frame includes a first supporting portion, and the optical film assembly is partially disposed between the first supporting portion and the display panel. In addition, the light-penetrated adhesive member is disposed between the first supporting portion of the supporting frame and the optical film assembly. The light-penetrated adhesive member includes a first portion disposed corresponding to the non-pixel region and a second portion disposed corresponding to the pixel region. Moreover, the supporting frame is light penetrated. Moreover, the connecting circuit board includes a reflective surface disposed corresponding to a side surface of the supporting frame. Compared with the conventional technology, the structural design of this disclosure can achieve the narrow border design, provide a sufficient structural strength, or improve the light leakage or shadow issue at the edge of the active area.

BRIEF DESCRIPTION OF THE DRAWINGS

The embodiments will become more fully understood from the detailed description and accompanying drawings, which are given for illustration only, and thus are not limitative of the present disclosure, and wherein.

DETAILED DESCRIPTION OF THE DISCLOSURE

The embodiments of the disclosure will be apparent from the following detailed description, which proceeds with reference to the accompanying drawings, wherein the same references relate to the same elements. Moreover, the drawings of all implementation are schematic, and they do not mean the actual size and proportion. The terms of direction recited in the disclosure, for example up, down, left, right, front, or rear, only define the directions according to the accompanying drawings for the convenience of explanation but not for limitation. In addition, if one element is formed on, above, under, or below another element, these two elements can be directly contacted with each other or not directly contacted with each other but have an addition element disposed therebetween. The names of elements and the wording recited in the disclosure all have ordinary meanings in the art unless otherwise stated. Therefore, a person skilled in the art can unambiguously understand their meanings.

Figure 1:
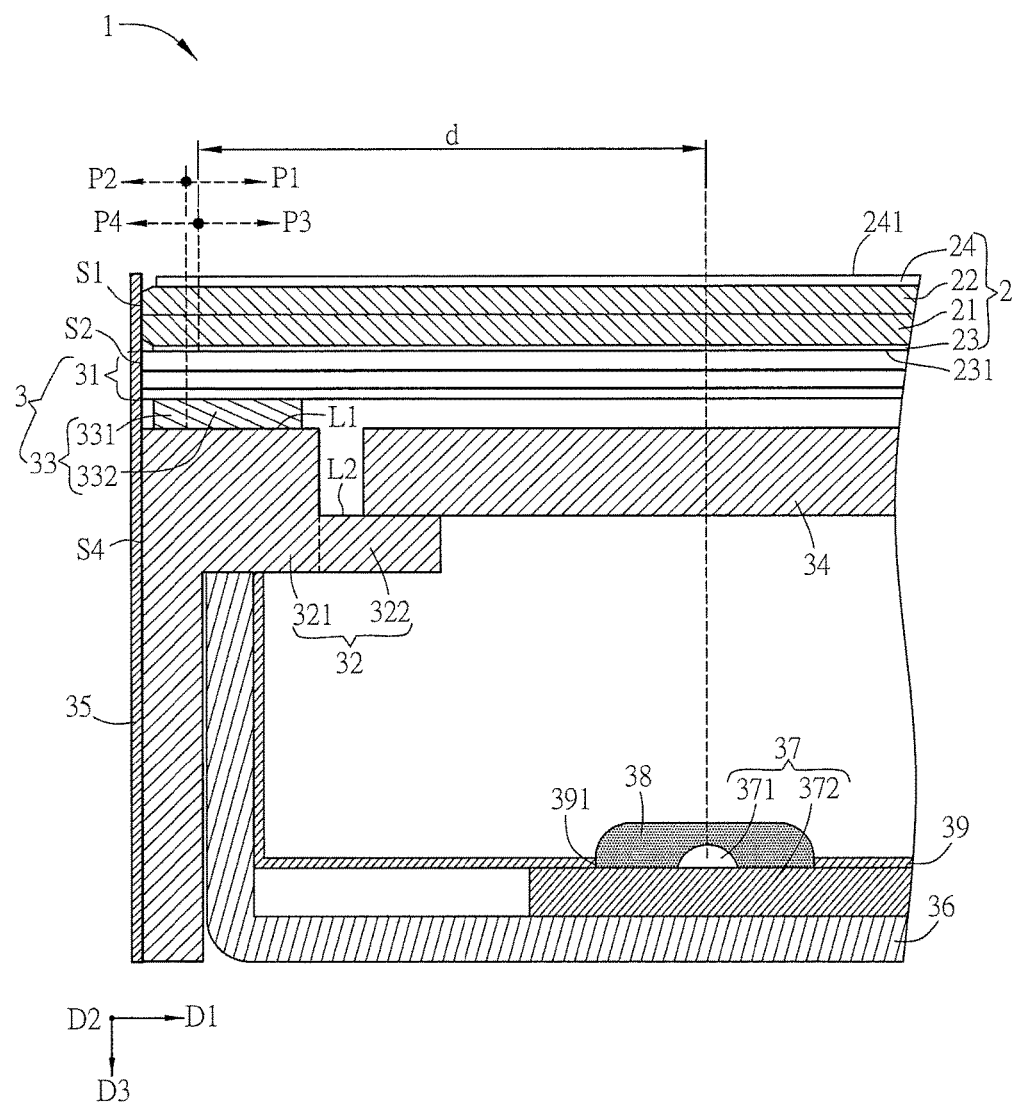
FIG. 1 is a schematic diagram showing a display device according to an embodiment of the disclosure.

FIG. 1 is a schematic diagram showing a display device 1 according to an embodiment of the disclosure.

The display device 1 includes a display panel 2 and a backlight module 3, which are disposed corresponding to each other. The display panel 2 can be an FFS (Fringe Field Switching) LCD panel, an IPS (In-plane switch) LCD panel, a TN (Twisted Nematic) LCD panel, a VA mode (Vertical Alignment mode) LCD panel, or any one of other types of LCD panels, and this disclosure is not limited.

To make the description of the disclosure more comprehensive, the figures show a first direction D1, a second direction D2 and a third direction D3, which are substantially perpendicular to one another. For example, the first direction D1 and the second direction D2 are substantially parallel to the surface of the display panel 2, and the third direction D3 is substantially perpendicular to the first direction D1 and the second direction D2. In other words, the third direction D3 is a normal direction of the display panel 2.

The display panel 2 includes a first substrate 21, a second substrate 22, a liquid crystal layer (not shown), and two polarizers 23 and 24. The first substrate 21 is disposed opposite to the second substrate 22, and the liquid crystal layer is disposed between the first substrate 21 and the second substrate 22. In this embodiment, the first substrate 21 is a TFT (thin-film-transistor) substrate, and the second substrate 22 is a CF (color filter) substrate. This configuration can form a pixel array containing a plurality of pixels. In other embodiments, the black matrix or the filter layer of the CF substrate can be formed on the TFT substrate, and the first substrate 21 becomes a BOA (BM on array) substrate or a COA (color filter on array) substrate, and this disclosure is not limited.

The polarizer 23 is a lower polarizer, and the polarizer 24 is an upper polarizer. The polarizer 23 (lower polarizer) is disposed on one side of the first surface 21 away from the second substrate 22, and the polarizer 24 (upper polarizer) is disposed at one side of the second substrate 22 away from the first substrate 21. In this case, the surface of the polarizer 24 away from the second substrate 22 is a first surface 241 of the display panel 2, and the surface of the polarizer 23 away from the first substrate 21 is a second surface 231 of the display panel 2. The polarizing axes of the two polarizers 23 and 24 substantially have a phase difference of 90 degrees, and the light characteristics can be modulated by controlling the intensity of the electric field to bias the liquid crystals, thereby enabling the display panel 2 to display images.

As viewing from the top of the display panel 2 (along the third direction D3 or the normal direction of the display panel 2), the display panel 2 includes a pixel region P1 and a non-pixel region P2. The pixel region P1 is a region of the display panel 2 for configuring the pixel array, which includes normal pixels and dummy pixels, and the non-pixel region P2 is a region outside of the pixel region P1 and configured without pixels. In addition, the pixel region P1 includes an active area P3, which is configured for displaying images. In the display panel 2, the area outside of the active area P3 is shielded by the black matrix for example and is not able to display the images, and it is named as an inactive area P4. In more detailed, the active area P3 is located within the pixel region P1, and the inactive area P4 contains the non-pixel region P2 and a part of the pixel region P1. In some embodiments, the width of the inactive area P4 (the border width) is, for example, less than or substantially equal to 1 mm.

The backlight module 3 is disposed corresponding to the display panel 2. The light emitted from the backlight module 3 enters the display panel 2, and the display panel 2 can display images. In this embodiment, the backlight module 3 is a direct-type backlight module and includes at least one optical film assembly 31, a supporting frame 32, and a light-penetrated adhesive member 33. In addition, the backlight module 3 of this embodiment can further include an optical unit 34, a reflective unit 35, a back frame 36, a light-emitting unit 37, an encapsulation unit 38, and a reflective plate 39.

The optical film assembly 31 is partially disposed between the supporting frame 32 and the display panel 2. In this embodiment, the optical film assembly 31 may include one or more optical films such as, for example but not limited to, diffuser, 90° prism, 0° prism, or brightness enhancement film, which are stacked along the third direction D3. This configuration of the optical film assembly 31 can provide a surface light source with better uniformity. In this case, an optical clear adhesive (OCA) or an optical clear resin (OCR) can be provided between the display panel 2 and the optical film assembly 31 (not shown) for attaching the optical film assembly 31 to the polarizer 23 (the second surface 231) of the display panel 2. To be noted, in the conventional display device, the optical film assembly 31 is disposed on the top surface of the diffuser (when the backlight module is a direct-type backlight module) or the light guiding plate (when the backlight module is an edge-type backlight module). The position of the optical film assembly 31 of this embodiment is different from the conventional structure and is located on and adhered to the lower surface of the display panel 2. In this embodiment, the optical film assembly 31 has high haze for improving the light leakage or shadow issue at the edge of the active area P3.

In this embodiment, the supporting frame 32 is light penetrated, and it can be, for example but not limited to, a light-penetrated plastic member or a glass. The material of the supporting frame 32 can be, for example but not limited to, PVC (polyvinyl chloride) or silicon dioxide. In addition, the supporting frame includes a first supporting portion 321 and a second supporting portion 322 connected to the first supporting portion 321. The first supporting portion 321 is connected to and around the second supporting portion 322. To be noted, the first supporting portion 321 can be a continuous structure disposed around the second supporting portion 322, or the supporting portion 321 can be a discontinuous structure disposed around the second supporting portion 322. When the supporting portion 321 is a discontinuous structure, it can faun one or more openings around the second supporting portion 322. A vertical distance along the third direction D3 between the second supporting portion 322 and the display panel 2 is greater than a vertical distance along the third direction D3 between the first supporting portion 321 and the display panel 2. In this embodiment, the first supporting portion 321 has an "L" shape, and the second supporting portion 322 has an "I" shape. This disclosure is not limited.

The light-penetrated adhesive member 33 is disposed between the first supporting portion 321 of the supporting frame 32 and the optical film assembly 31. In this embodiment, the light-penetrated adhesive member 33 extends along the first direction D1 from a region corresponding to the non-pixel region P2 to a region corresponding to the pixel region P1. The light-penetrated adhesive member 33 includes a first portion 331 and a second portion 332. As viewing from the third direction D3, the first portion 331 is disposed corresponding to the non-pixel region P2, and the second portion 332 is disposed corresponding to the pixel region P1. In other words, as the light-penetrated adhesive member 33 is projected on the display panel 2, the first portion 331 is overlapped with the non-pixel region P2, and the second portion 332 is overlapped with the pixel region P1. In some embodiments, the first portion 331 is disposed corresponding to the inactive area P4, and the second portion 332 is disposed corresponding to the active area P3.

In this embodiment, the first supporting portion 321 of the supporting frame 32 has a first supporting surface L1, which is disposed corresponding to a part of the active area P3 and the inactive area P4. The light-penetrated adhesive member 33 is disposed on the first supporting surface L1 for bonding the optical film assembly 31 to the supporting frame 32. The light-penetrated adhesive member 33 is, for example but not limited to, a high-transparent and/or high-adhesion double-sided adhesive material (e.g. transparent double-sided adhesive), and it is used for attaching the optical film assembly 31 and the first supporting surface L1 of the supporting frame 32. In other embodiments, a liquid transparent adhesive material is applied between the optical film assembly 31 and the first supporting surface L1 of the supporting frame 32. Afterwards, the liquid transparent adhesive material is solidified to form the high-transparent and/or high-adhesion light-penetrated adhesive member 33. This disclosure is not limited.

The second supporting portion 322 is disposed corresponding to the pixel region P1. In some embodiments, the second supporting portion 322 is disposed corresponding to a part of the active area P3, and the optical unit 34 is disposed between the second supporting portion 322 and the optical film assembly 31. In this embodiment, the backlight module 3 is a direct-type backlight module, the optical unit 34 is a diffuser or a haze glass and is disposed on the second supporting surface L2 of the second supporting portion 322 and supported by the second supporting portion 322 of the supporting frame 32. To be noted, the material of the haze glass is similar to the material of the display panel 2, so they have similar thermal expansion rate. This feature can increase the reliability of the display device 1. Accordingly, the optical unit 34 can be a haze glass.

In another embodiment, each of the display panel 2, the optical film assembly 31, the light-penetrated adhesive member 33 and the supporting frame 32 is light penetrated or partially light penetrated. In order to increase the light utility, the reflective unit 35 is disposed on, for example but not limited to, a lateral side surface of the display panel 2, a lateral side surface of the optical film assembly 31, a lateral side surface of the light-penetrated adhesive member 33 and/or a lateral side surface of the supporting frame 32 for reflecting the light, which is emitted from the backlight module 3 to the lateral side surfaces S1~S4, towards the display panel 2. This configuration can effectively increase the light utility. To be noted, the lateral side surfaces S1~S4 are shown from the top to the bottom, and the lateral side surface S3 of the light-penetrated adhesive member 33 is not shown. In this embodiment, the reflective unit 35 is a reflective plate or a reflective material with high reflectiveness such as, for example but not limited to, metal, metal oxide, high reflective paint (white paint), facet coating, or any of their combinations. The disclosure is not limited.

The back frame 36 is configured to support the backlight module 3 for providing the protections to collision, electromagnetic wave, electric shock, or moisture. In this embodiment, the back frame 36 is disposed at the inner side of the supporting frame 32. The back frame 36 can be made of plastics, metal, alloy, polyester, carbon fiber, or any of their combinations, and this disclosure is not limited. The light-emitting unit 37 is disposed on the back frame 36 and includes at least one lighting unit 371 disposed on a substrate 372. The encapsulation unit 38 covers the lighting unit 371, and the amount of the encapsulation unit 38 is the same as or less than the amount of the lighting unit 371. In some embodiments, the light-emitting unit 37 includes a plurality of lighting units 371 arranged in an array (two-dimensional array), and the encapsulation unit 38 includes at least one encapsulation member arranged in an array (secondary lenses). In this embodiment, the amount of the encapsulation units 38 is equal to the amount of the light units 371. The at least one encapsulation unit 38 is disposed to cover the lighting units 371, respectively. In addition, the lighting unit 371 includes a reflective structure and an additional encapsulation body (not shown). The reflective structure is, for example but not limited to, a reflective cap or a reflective cup, and the internal surface of the reflective structure is configured with a reflective material with high reflectivity for reflecting the light. The encapsulation body is also light penetrated (primary lens) and is disposed inside the reflective structure for covering the LED chip. This configuration can protect the LED chip from the pollution of the dusts, moistures or other objects and thus remain the lighting characteristics thereof.

To be noted, a shortest distance d between the edge of the active area P3 of the display panel 2 and the middle position of the lighting unit 371 is 10~40 mm. The lighting unit 371 is one of the lighting units which is the closet one to the lateral side surfaces S4 of the supporting frame 32. This configuration allows the edge of the active area P3 of the display panel 2 (the junction between the active area P3 and the inactive area P4) to have higher brightness.

The reflective plate 39 is disposed on the back frame 36 or the substrate 372 for reflecting the light, which is emitted to the back frame 36, back to the optical unit 34. This configuration can increase the light utility. In this embodiment, the reflective plate 39 is disposed on the substrate 372, and the lighting unit 371 and the encapsulation unit 38 are disposed corresponding to the openings 391 of the reflective plate 39. Herein, the reflective plate 39 includes the reflective material with high reflectivity, and the reflective material can be, for example but not limited to, metal, metal oxide, high reflective paint (white paint), facet coating, or any of their combinations. The disclosure is not limited. In other embodiments, the backlight module 3 may not include the reflective plate 39, but have a reflective film coated on the back frame 36 for reflecting the light. The disclosure is not limited.

In this embodiment, the lower surface of the display panel 2 is attached with the high haze optical film assembly 31 for hazing the light-shadow defect between an adhesion area of the display panel 2 corresponding to the light-penetrated adhesive member 33 and a non-adhesion area of the display panel 2 not corresponding to the light-penetrated adhesive member 33. The light transmission medium corresponds to the adhesion area is the transparent double-sided adhesive, and the light transmission medium corresponds to the non-adhesion area is air. The configuration of the optical film assembly 31 can provide the haze effect to improve the light-shadow defect caused by different transmission media.

A first portion 331 of the light-penetrated adhesive member 33 is disposed corresponding to the non-pixel region P2, and a second portion 332 of the light-penetrated adhesive member 33 is disposed corresponding to the pixel region P1. This configuration can increase the bonding area and bonding strength of the light-penetrated adhesive member 33, solve the issue of insufficient fixing width for the narrow border display device 1, and improve the shielding issue. Accordingly, the display device 1 can achieve the desired narrow border design, and provide a sufficient structural strength. Besides, the supporting frame 32 of the disclosure is light penetrated, and the light emitted from the bottom to the top can pass through the supporting frame 32. Accordingly, this configuration can improve the light leakage issue and the shadow issue ate the edge of the active area of the conventional display device.

To be noted, the optical film assembly 31 and the light-penetrated adhesive member 33 must be optionally selected from cooperated materials. In this embodiment, an absolute value of a difference between a transmittance of the optical film assembly 31 and a transmittance of the light-penetrated adhesive member 33 is greater than or equal to 0% and less than or equal to 20%.

Figure 2:
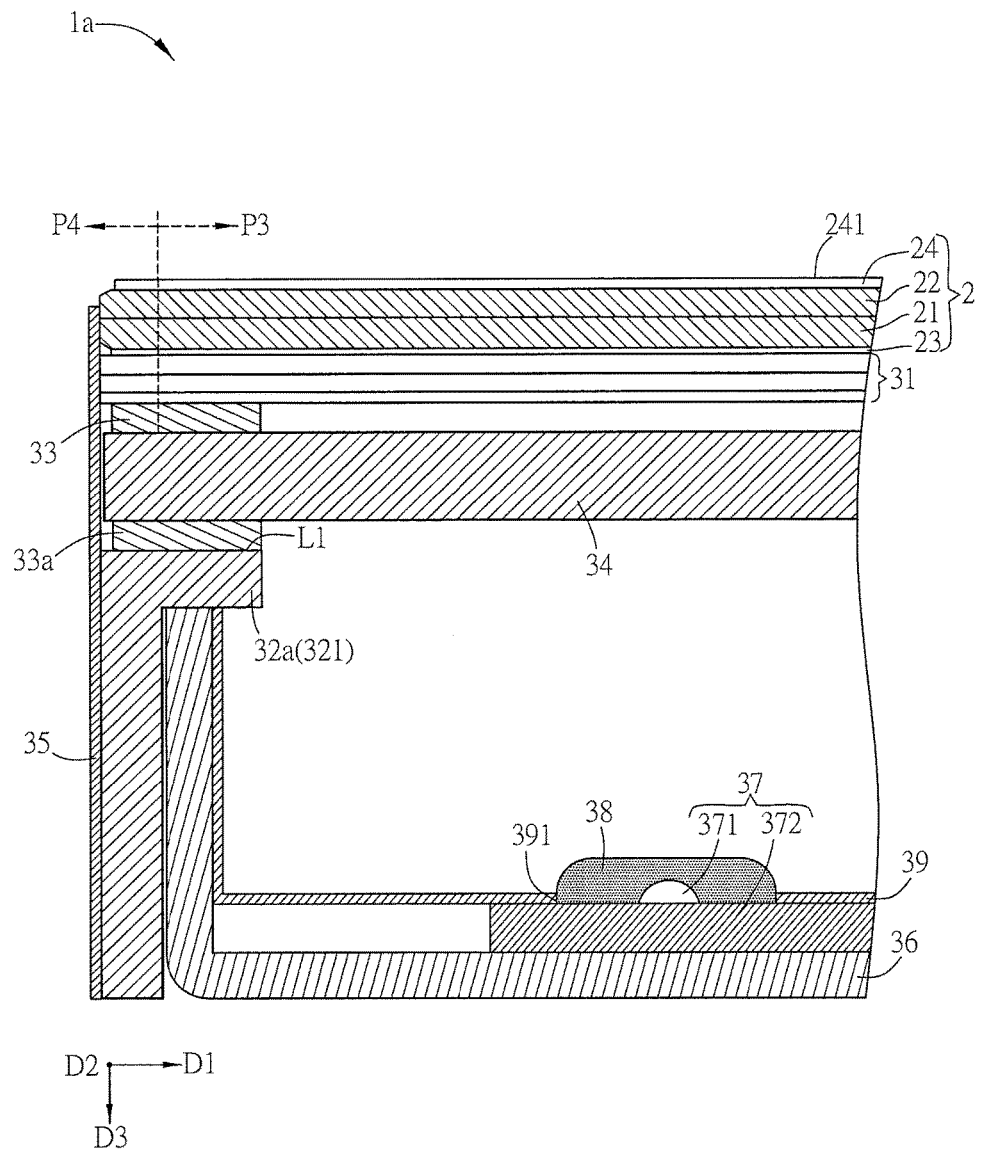
FIGS. 2 to 4 are schematic diagrams showing the display devices of different aspects of the disclosure.
Figure 3:
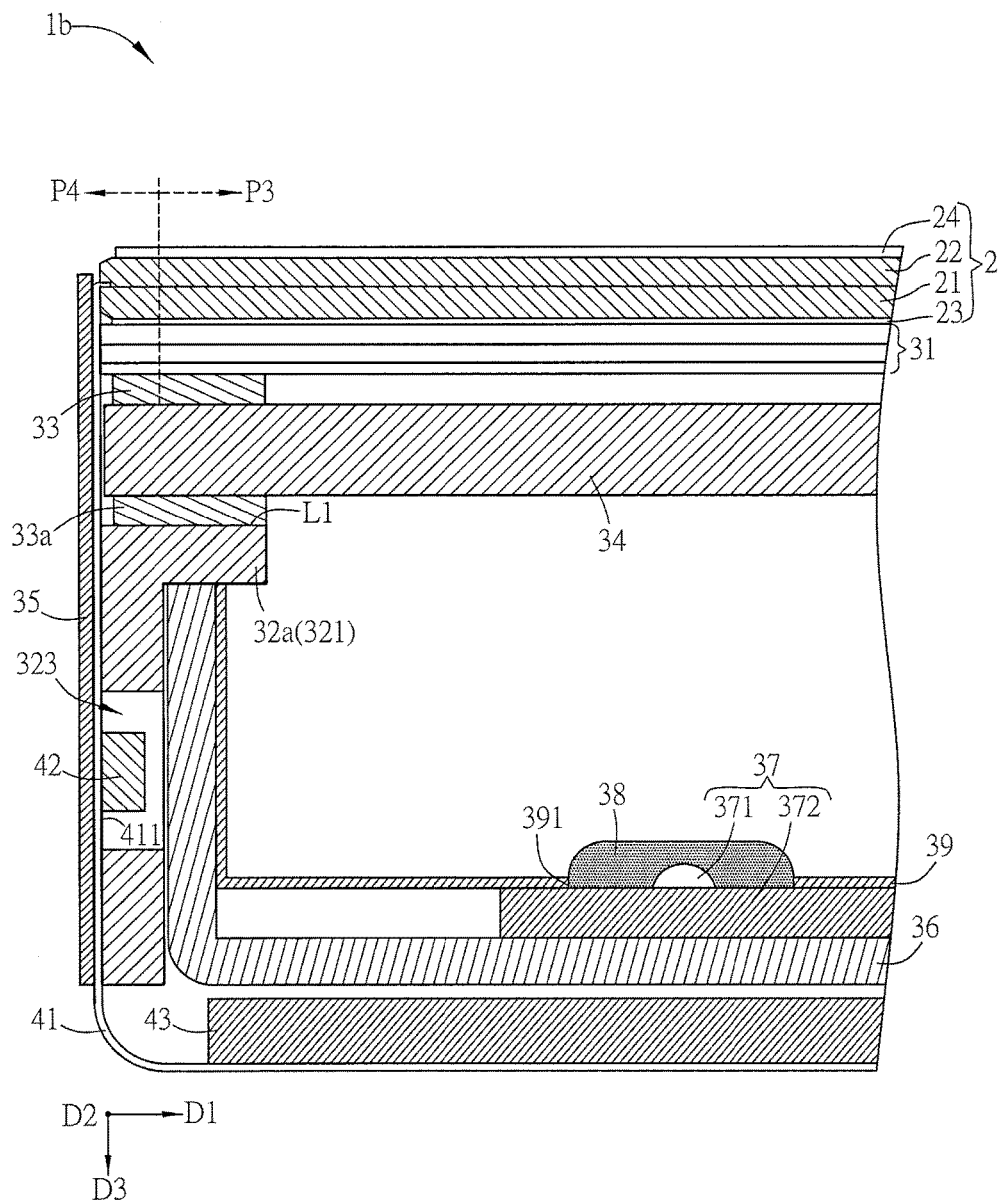
Figure 4:
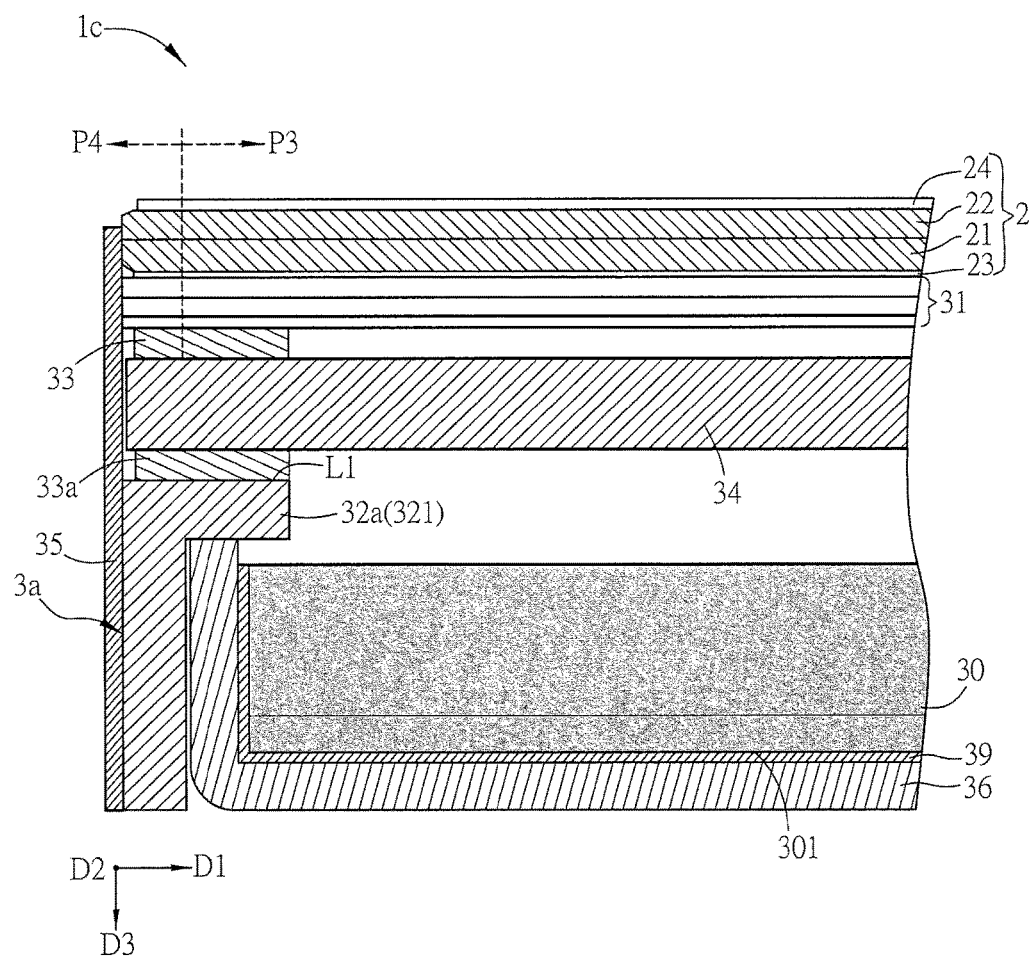

FIGS. 2 to 4 are schematic diagrams showing the display devices 1a~1c of different aspects of the disclosure.

As shown in FIG. 2, different from the display device 1 of FIG. 1, the optical unit 34 of the display device 1a is disposed between the first supporting portion 321 of the supporting frame 32a and the light-penetrated adhesive member 33. In this case, the display device 1a further includes another light-penetrated adhesive member 33a. Similar to the light-penetrated adhesive member 33, the light-penetrated adhesive member 33a extends along the first direction D1 from a region corresponding to the non-pixel region to a region corresponding to the pixel region. The light-penetrated adhesive member 33a is disposed between the optical unit 34 and the first supporting portion 321 of the supporting frame 32a, and the light-penetrated adhesive member 33 is disposed between the optical film assembly 31 and the optical unit 34. The light-penetrated adhesive members 33 and 33a are configured to fix the optical film assembly 31, the optical unit 34, and the supporting frame 32a. In this embodiment, the optical unit 34 is made of haze glass.

The other technical features of the display device 1a can be referred to the same components of the display device 1, so the detailed descriptions thereof will be omitted.

In this embodiment, the lower surface of the display panel 2 is attached with the high haze optical film assembly 31 for hazing the light-shadow defect of the adhesion area and non-adhesion area of the display panel 2. The adhesion area is the area of the display panel 2 corresponding to the light-penetrated adhesive members 33 and 33a, and the non-adhesion area is the area of the display panel 2 not corresponding to the light-penetrated adhesive members 33 and 33a. The light-penetrated adhesive members 33 and 33a extend from the inactive area P4 to the active area P3. This configuration can increase the bonding area and bonding strength of the light-penetrated adhesive members 33 and 33a, solve the issue of insufficient fixing width for the narrow border display device 1a, and improve the shielding issue. Accordingly, the display device 1a can achieve the better narrow border design, and provide a sufficient structural strength. Besides, the supporting frame 32a of the disclosure is light penetrated, and the optical unit 34 is disposed between the supporting frame 32a and the optical film assembly 31. This configuration can reduce the light-dark difference caused by the gap between the optical unit 34 and the supporting frame 32a, and further improve the uniformity of the display image of the display panel 2.

As shown in FIG. 3, different from the display device 1a of FIG. 2, the display device 1b further includes a connecting circuit board 41, a chip 42, and a control circuit board 43. The connecting circuit board 41 is, for example but not limited to, a chip on film (COF), and the chip 42 is disposed on the connecting circuit board 41 and located in a recess 323 of the supporting frame 32a. In this embodiment, the recess 323 is located at a side surface of the supporting frame 32a. This disclosure is not limited. In addition, one end of the connecting circuit board 41 is electrically connected to the display panel 2, and the other end thereof is electrically connected to the control circuit board 43, which could be located under the back frame 36 in this embodiment. The control circuit board 43, the chip 42 and the connecting circuit board 41 are configured to control the operation of the display panel 2. In addition, the connecting circuit board 41 includes a reflective surface 411 disposed corresponding to the side surface of the supporting frame 32a, which is substantially parallel to a normal direction of the display panel 2 (the third direction D3). The connecting circuit board 41 can be a reflective plate or a reflective material with high reflectiveness such as, for example but not limited to, metal, metal oxide, high reflective paint (white paint), facet coating, or any of their combinations. In this embodiment, the connecting circuit board 41 has a reflective surface 411 disposed corresponding to the supporting frame 32a, and a reflective material with high reflectiveness is configured on the reflective surface 411. Accordingly, the reflective surface 411 of the connecting circuit board 41 can reflect the light, which is emitted from the backlight module 3 to the display panel 2, the optical film assembly, 31, the optical unit 34, the light-penetrated adhesive member 33a and the supporting frame 32a, back to the display device 1b, thereby increasing the light utility.

The other technical features of the display device 1b can be referred to the same components of the display device 1a, so the detailed descriptions thereof will be omitted.

As shown in FIG. 4, different from the display device 1a of FIG. 2, the backlight module 3a of the display device 1c is an edge-type backlight module. In general, at least one side of the edge-type backlight module is configured with a light source. FIG. 4 shows the side, which is not configured with the light source, so the light-emitting unit 37 and the encapsulation unit 38 are not shown in FIG. 4. The reflective plate 39 of the display device 1c is disposed on the back frame 36. In addition, the backlight module 3a of this embodiment further includes a light guiding plate 30, and the reflective plate 39 is disposed between the bottom surface 301 of the light guiding plate 30 and the back frame 36 for reflecting the light emitted from the bottom surface 301 back to the light guiding plate 30.

The other technical features of the display device 1c can be referred to the same components of the display device 1a, so the detailed descriptions thereof will be omitted.

Figure 5:
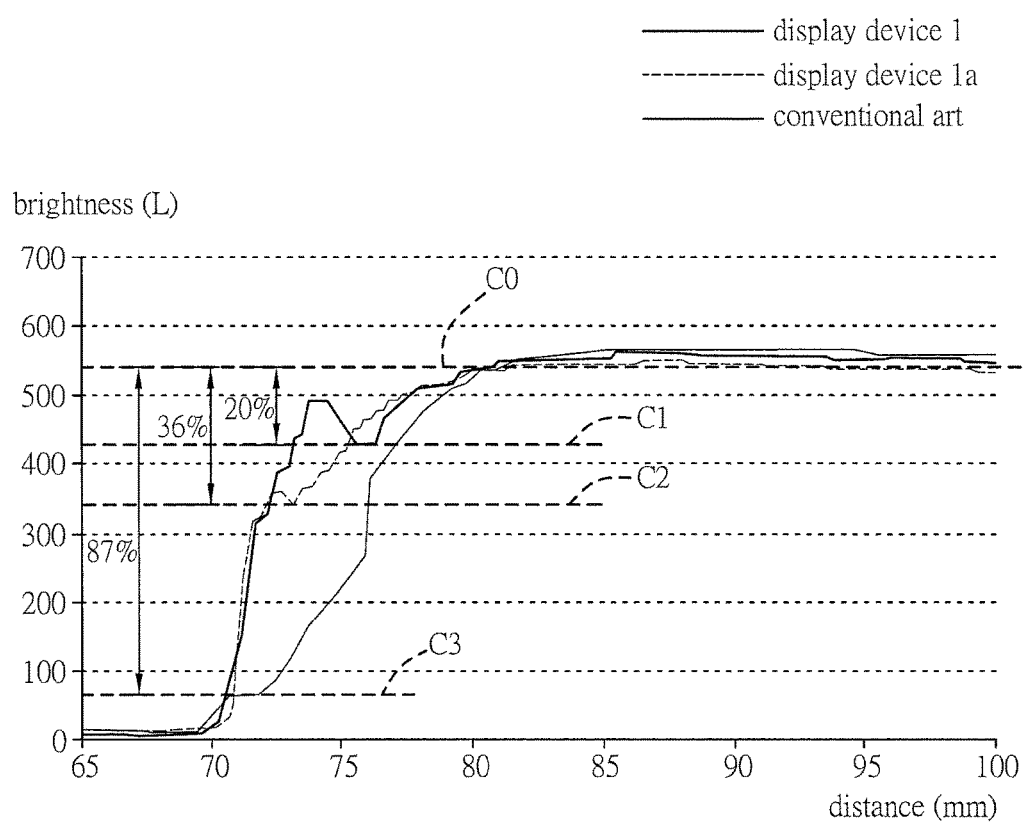
FIG. 5 is a schematic chart showing the brightness curves of the edge areas of the active areas in the display devices of the conventional art and the present disclosure.

FIG. 5 is a schematic chart showing the brightness curves of the edge areas of the active areas in the display device of the conventional art and the display devices 1 and 1a the present disclosure. The horizontal axis is the distance (mm) between the edge of the active area and a point inside the active area, and the vertical axis is the brightness (nit). In addition, the dashed line C0 corresponds to the brightness of the middle region of the active area, the dashed line C1 corresponds to the brightness of the edge area of the display device 1 with bad image quality (corresponding to the obvious trough of the curve between the edge and the middle region), the dashed line C2 corresponds to the brightness of the edge area of the display device 1a with bad image quality, and the dashed line C3 corresponds to the brightness of the edge area of the conventional display device with bad image quality.

As shown in FIG. 5, in the conventional display device, the brightness curve indicates that it needs a certain distance from the edge to reach the maximum brightness, so the light-shadow defect is obvious, which can cause bad image quality. In the display device 1 and 1a of this disclosure, the brightness curves indicate that it needs a shorter distances from the edge to reach the brightness approaching the middle region, so the light-shadow defect is not so obvious and the visible image quality is better. In the conventional display device, the difference between the brightness of the middle region and the brightness of the edge area is about 87% (the difference between the dashed lines C0 and C3). This difference means that the shadow is obvious and the visible image quality is bad. In the display device 1, the difference between the brightness of the middle region and the brightness of the edge area is about 20% (the difference between the dashed lines C0 and C1). This difference means that the visible image quality is better. In the display device 1a, the difference between the brightness of the middle region and the brightness of the edge area is about 36% (the difference between the dashed lines C0 and C2). This difference means that the visible image quality is better.

As mentioned above, in the display device of this disclosure, the supporting frame includes a first supporting portion, and the optical film assembly is partially disposed between the first supporting portion and the display panel. In addition, the light-penetrated adhesive member is disposed between the first supporting portion of the supporting frame and the optical film assembly. The light-penetrated adhesive member includes a first portion disposed corresponding to the non-pixel region and a second portion disposed corresponding to the pixel region. Compared with the conventional technology, the structural design of this disclosure can achieve the narrow border design, provide a sufficient structural strength, or improve the light leakage or shadow issue at the edge of the active area.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A display device, comprising:
a supporting frame comprising a first supporting portion;
a display panel disposed on the supporting frame and comprising a pixel region and a non-pixel region, wherein the non-pixel region is disposed outside of the pixel region;
an optical film assembly partially disposed between the first supporting portion of the supporting frame and the display panel; and
a first light-penetrated adhesive member disposed between the first supporting portion of the supporting frame and the optical film assembly;
wherein, the first light-penetrated adhesive member comprises a first portion disposed corresponding to the non-pixel region and a second portion disposed corresponding to the pixel region.

2. The display device of claim 1, wherein a difference between a transmittance of the optical film assembly and a transmittance of the first light-penetrated adhesive member is greater than 0% and smaller than 20%.

3. The display device of claim 1, wherein the supporting frame is light penetrated.

4. The display device of claim 1, further comprising:
an optical unit, wherein the supporting frame further comprises a second supporting portion disposed corresponding to the pixel region, the first supporting portion is connected to and around the second supporting portion, a vertical distance between the second supporting portion and the display panel is greater than a vertical distance between the first supporting portion and the display panel, and the optical unit is disposed between the second supporting portion and the optical film assembly.

5. The display device of claim 4, wherein the optical unit is a diffuser or a haze glass.

6. The display device of claim 1, further comprising:
an optical unit disposed between the first supporting portion and the first light-penetrated adhesive member.

7. The display device of claim 6, further comprising a second light-penetrated adhesive member disposed between the optical unit and the supporting frame.

8. The display device of claim 6, wherein the optical unit is a diffuser or a haze glass.

9. The display device of claim 1, further comprising:
a reflective unit disposed corresponding to a side surface of the supporting frame.

10. The display device of claim 1, wherein the display panel further comprises a polarizer attached to the optical film assembly.

11. The display device of claim 1, further comprising:
a connecting circuit board comprising a reflective surface disposed corresponding to a side surface of the supporting frame, wherein the side surface of the supporting frame is substantially parallel to a normal direction of the display panel.

12. A display device, comprising:
a supporting frame comprising a first supporting portion, wherein the supporting frame is light penetrated;
a display panel disposed on the first supporting portion of the supporting frame;
an optical film assembly partially disposed between the first supporting portion of the supporting frame and the display panel;
a light-penetrated adhesive member disposed between the first supporting portion of the supporting frame and the optical film assembly; and
a connecting circuit board comprising a reflective surface disposed corresponding to a side surface of the supporting frame, wherein the side surface of the supporting frame is substantially parallel to a normal direction of the display panel.

13. The display device of claim 12, wherein a difference between a transmittance of the optical film assembly and a transmittance of the light-penetrated adhesive member is greater than 0% and smaller than 20%.

14. The display device of claim 12, wherein the display panel comprises a pixel region and a non-pixel region, the non-pixel region is disposed outside of the pixel region, and the light-penetrated adhesive member comprises a first portion disposed corresponding to the non-pixel region and a second portion disposed corresponding to the pixel region.

15. The display device of claim 14, further comprising:
an optical unit, wherein the supporting frame further comprises a second supporting portion disposed corresponding to the pixel region, the first supporting portion is connected to and around the second supporting portion, a vertical distance between the second supporting portion and the display panel is greater than a vertical distance between the first supporting portion and the display panel, and the optical unit is disposed between the second supporting portion and the optical film assembly.

16. The display device of claim 15, wherein the optical unit is a diffuser or a haze glass.

17. The display device of claim 12, further comprising:
an optical unit disposed between the first supporting portion and the light-penetrated adhesive member.

18. The display device of claim 17, wherein the optical unit is a diffuser or a haze glass.

* * * * *